UNITED STATES PATENT OFFICE.

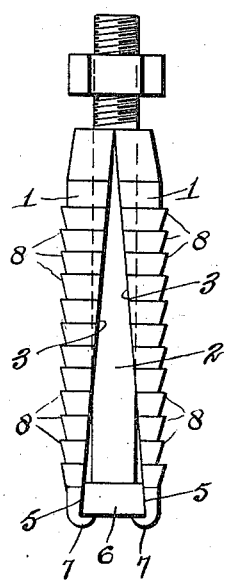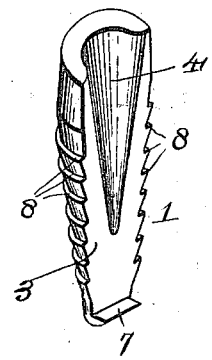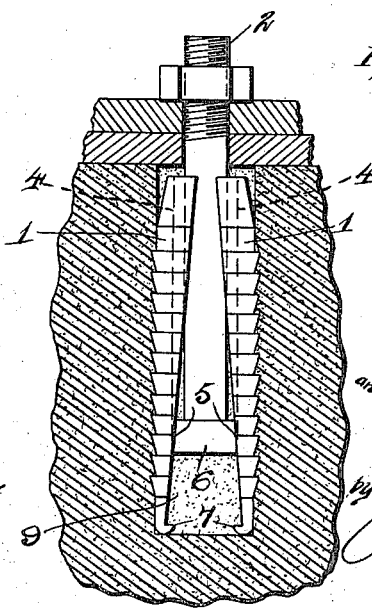

BEECHER FRANK AND AUGUST O. LUNDBERG, OF CHICAGO, ILLINOIS.

ANCHOR DEVICE FOR BOLTS.

1,034,607.  Specification of Letters Patent. Patented Aug. 6, 1912.

Application filed September 22, 1911. Serial No. 650,841.

*To all whom it may concern:*

Be it known that we, BEECHER FRANK and AUGUST O. LUNDBERG, citizens of the United States, residing at the city of Chicago, county of Cook, and State of Illinois, have invented certain new and useful Improvements in Anchoring Devices for Bolts, of which the following is a specification.

Our invention relates to anchoring devices for bolts and more specifically to devices adapted for use where it is desired to secure the end of a bolt in concrete, cement or the like.

The object of our invention is the production of a device of the character mentioned which will be of extremely simple construction. One which may be readily and expeditiously inserted for use, and one which will be of high efficiency in operation.

Other objects will appear hereinafter.

With these objects in view our invention consists in the combinations and arrangements of parts hereinafter described and claimed.

Our invention will be best understood by reference to the accompanying drawing forming a part of this specification and in which, Figure 1 is a side elevation of an anchoring device embodying our invention arranged in position for use upon the bolt, Fig. 2 is a perspective view of one of the anchor members of the device detached, and Fig. 3 is a view showing a section of a wall with our improved anchoring device arranged therein to anchor the bolt in position.

The preferred form of construction as illustrated in the drawing comprises two similar members 1 formed preferably of metal. Each of the members 1 is wedge shaped in form and semi-circular in cross-section. The members 1 are adapted to be arranged upon the opposite sides of the bolt 2 with their flat sides 3 adjacent the latter. Said surfaces 3 at the thick ends of said members 1 being centrally grooved or cut away at 4 in order to accommodate the bolt as will be readily understood. The opposite ends of the members 1 are adapted to engage against the opposite sides 5 of the square head 6 of the bolt, said sides 5 being preferably inclined as shown to correspond with the inclination of the surfaces
3. When thus arranged upon a bolt the members 1 will be so disposed that the lateral surfaces thereof will be substantially parallel with the axis of the bolt, a mutilated cylinder being virtually formed by the sides of said members. The lower or contracted ends of the members 1 are bent inwardly as at 7 to serve as stops for engagement with the head 6 of the bolt so as to facilitate insertion of the members 1 into a hole, it being clear that with this provision the members 1 may be readily forced down into a hole or recess by simply forcing the projecting extremity of the bolt inwardly.

In using the device the members 1 are first arranged about the bolt which it is desired to anchor in the manner shown in Fig. 1. Said members together with the headed end of the bolt are then inserted into the hole or recess 9 which has been previously drilled for the reception thereof. Upon outward drawing of the bolt 2 after thus positioning the members 1, the latter will be expanded by contact of the inclined surfaces 3 thereof with the sides 5 of the bolt head 6, it being clear that the farther the bolt is drawn outwardly the greater will be the expansion or separation of the members 1, effecting the forcing of said members against the opposite sides of the recess or hole. This forcing of the members 1 against the sides of the recess serves to lock the same therein and hence to anchor the head of the bolt in position.

In order to positively prevent slipping of the members 1 upon the surfaces engaged thereby, the lateral or curved surfaces of said members are provided with gripping teeth 8 of any suitable form, circumferential teeth as shown in the drawing being preferably formed therein. Said curved surfaces of the members 1 at the outer or thick ends of the latter are tapered or beveled as shown so that in use the members 1 will not contact with the sides of the hole or recess adjacent the outer extremity thereof, such construction being adopted in order to prevent chipping or breaking out of the stone or concrete at the mouth of the opening because of the pressure which otherwise would be exerted thereon.

An anchoring device of the construction set forth is extremely simple in construction, hence may be manufactured at a low cost. The device is capable of expeditious and ready arrangement for use and is adapted when once arranged in operative position to firmly and securely anchor the bolt in conjunction with which the same is used.

While we have illustrated and described the preferred construction for carrying our invention into effect, the same is capable of variation or modification without departing from the spirit of the invention. We therefore do not wish to be limited to the exact details of construction set forth, but desire to avail ourselves of such variations and modifications as come within the scope of the appended claim.

Having described our invention what we claim as new and desire to secure by Letters Patent is:

In a device of the class described, the combination with a bolt having a head provided with opposite flat surfaces, of two wedge shaped members arranged at opposite sides of said bolt with their wedge surfaces engaging against said opposite flat surfaces of said bolt head, said flat surface of said wedge shaped members at the thick ends of the latter being centrally grooved for a portion only of their extent, substantially as described.

In testimony whereof we have signed our names to this specification in the presence of two subscribing witnesses.

BEECHER FRANK.
AUGUST O. LUNDBERG.

Witnesses:
ARTHUR A. OLSON,
JOSHUA R. H. POTTS.